L. A. LAURSEN.
PISTON PACKING.
APPLICATION FILED JAN. 21, 1914.
1,130,615.
Patented Mar. 2, 1915.
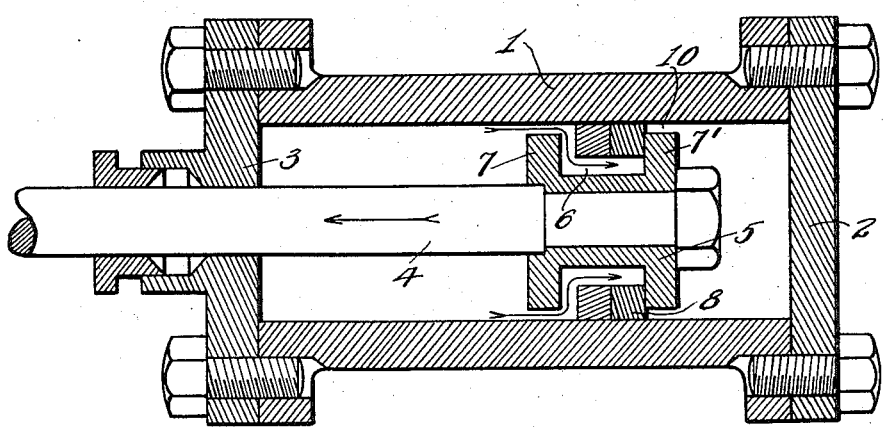
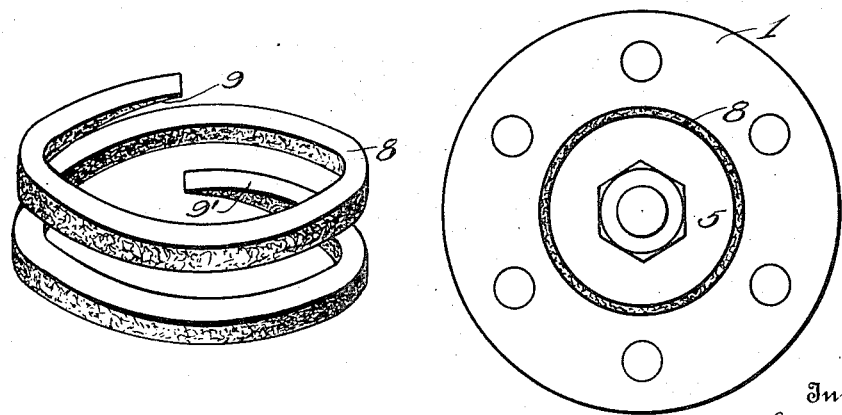

UNITED STATES PATENT OFFICE.

LAURITS A. LAURSEN, OF EAU CLAIRE, WISCONSIN.

PISTON-PACKING.

1,130,615.

Specification of Letters Patent.

Patented Mar. 2, 1915.

Application filed January 21, 1914. Serial No. 813,551.

*To all whom it may concern:*

Be it known that I, LAURITS A. LAURSEN, a citizen of the United States, residing at Eau Claire, in the county of Eau Claire and State of Wisconsin, have invented certain new and useful Improvements in Piston-Packings, of which the following is a specification.

The present invention appertains to improvements in piston packings, the primary object in view being to provide a peculiarly formed article of this nature whereby an effective seal may at all times, under any condition of wear and tear of either the cylinder or the packing itself, be maintained between the piston and its cylinder walls. More specifically, this object may be defined by stating that it is comprehended by my invention to employ a packing which is coiled about the piston so that the wear on the outer periphery thereof is counteracted by the relative unwinding of the coil under action of pressure directed against the inner peripheral surface of said packing.

To more readily understand the advantages and function of my novel combination, it is explained that heretofore it has ben customary to provide pistons with metallic, resilient rings to prevent leakage of pressure past said piston, and it has been found necessary in order to render the same efficient to employ generally a number of such rings and to specially form the ends of said rings with lapped joints, as well as to stagger the joint of one ring with respect to another. In spite of such arrangement and precautions, however, in the course of time the wear between the piston rings and the cylinder walls becomes sufficient to permit leakage and the expansive power of the rings is incapable of maintaining a liquid seal. To overcome this difficulty it has also been proposed to dispose springs beneath the piston rings tending to open the same as they wear, but this adds so materially to the friction as to meet with disapproval. Hence it is that I propose to surmount these difficulties by using a flexible packing which is preferably of non-metallic material and substantially non-resilient in action, which packing, in the form of a helical coil, is disposed in an annular peripheral groove in the piston, said groove being slightly wider than the packing in coiled shape, as a whole, and deeper than the packing in thickness. This loose mounting of said packing admits the pressure fluid beneath the packing so as to force the same against the cylinder walls. The piston is also formed with a clearance between it and the cylinder walls aforesaid whereby the pressure is exerted laterally and outwardly against the packing with equal force, providing an effective seal of the character desired. Since a series of coils are provided, as the wear on the outer surface takes place the pressure expands the packing and this expansion is accommodated by the coils unwinding without any chance of slippage past the packing occurring as is incidental to the opening of the joints under wear in the use of expansion packing rings such as hereinbefore mentioned.

With the above and other objects in view, this invention consists in the construction, combination and arrangement of parts all as hereinafter more fully described, claimed and illustrated in the accompanying drawings, wherein:

Figure 1 is a longitudinal sectional view taken through a cylinder and showing my particular form of packing disposed upon the piston; Fig. 2 is an end view with the cylinder head removed; and Fig. 3 is a perspective view of my special packing alone.

Throughout the following detail description, and on the several figures of the drawings, similar parts are referred to by like reference characters.

Specifically describing the embodiment of my invention, the numeral 1 designates a cylinder of usual construction having the closure 2 for the same at one end and an apertured closure 3 for the other end, through which last mentioned closure extends the piston rod 4 having at its inner terminal the piston head 5, said rod and head being hereinafter referred to as the piston. The outer periphery of the piston is suitably formed with a groove 6 which groove forms spaced flanges 7 and 7'. Disposed within the groove 6 of the piston is the essential feature of my invention, namely, the packing member 8, most clearly shown in Fig. 3 of the drawing. This packing consists preferably of non-metallic and non-resilient material and is known generally to the commercial trade as hydraulic packing, it being understood that such packing is composed of a textile fabric such as is customarily employed in articles of this nature and well known to those skilled in the art to which this invention refers. It will be noted by reference to the aforesaid Fig. 3 that the packing member is in the form of a helical coil, there being shown in the drawing two of such coils but the said member may be formed of any desired number of such coaxial coils. Each terminal of said packing is beveled off as indicated at 9 and 9', said beveled terminals lying substantially adjacent each other at opposite sides of an intermediate ring or coil of the material, in this manner forming an endless construction which, as will be obvious, may consist of more than the number of coils which is illustrated in the present drawing.

It will be noted by reference to Fig. 1 that the packing member 8 just described is loosely mounted in the groove 6 so as to provide a space both between the walls of the flanges 7 and 7' and beneath the packing between the same and the bottom of the groove. This is an essential arrangement in my improvements as will be now particularly referred to. The piston is preferably formed smaller circumferentially than the bore of the cylinder so as to leave a clearance space over the flanges 7 and 7' as indicated by the numeral 10.

While the construction comprehended by my invention may be employed in various mechanisms, the operation and use of the same is described particularly with reference to a piston for hydraulic pumps in which it is particularly essential that the packing of said piston shall form an effective liquid seal to obtain the best results, which prevents leakage of the fluid over the piston member. As the fluid pressure, for instance water, is exerted against the piston when the same is moved in the direction of the arrow in Fig. 1, said fluid forces the packing toward the right and against the wall of the flange 7', leaving a passage for the fluid over the flange 7 and downwardly about the packing and the inner wall of said flange to the bottom of the groove 6 beneath the packing. Therefore if the pressure against the piston amounts to ten pounds, such pressure will be exerted laterally against the packing and to an equivalent extent outwardly on the inner periphery of said packing 8. This prevents any leakage whatsoever past the piston, as will be obvious, particularly because the packing coil is expanded and pressed against the cylinder walls to an amount equivalent to the pressure which is exerted against the piston. By reason of the fact that the packing consists of a series of coils, as wear on the outer peripheral surface of the packing occurs the pressure beneath the packing tends to unwind the coil so as to counteract the extent of wear automatically as it takes place. As the unwinding of the spiral takes place in the expansion of the packing the coils move relatively to each other and since more than one coil is provided no space is formed between the terminals of the packing member, or in other words, a perfect circumferential contact entirely about the packing surface is maintained by this special form of packing member. As the pressure is exerted in the manner hereinbefore described against the packing it will be obvious that the coils of the packing are forced closely together into a very compact form. If the pressure against the piston is increased from the amount hereinbefore mentioned to, say, one hundred pounds, the equivalent pressure is exerted outwardly on the packing member by reason of the fact that said fluid pressure is admitted beneath the same to act upon the inner peripheral surface.

Numerous advantages are inherent to a combination of elements such as comprehended by my description and a few may be mentioned. The application of piston rings to a piston generally requires special tools in order to overcome their spring tension which is afforded them for the purpose of taking up the wear on the cylinder walls and said rings. In my construction, however, the removal of the piston and placing of the spirally formed packing member in the packing groove is a very simple matter, as the coils may be suitably contracted by manual pressure to admit of the insertion of the piston into the cylinder. No special formation of joints is required in my piston member and it is not essential that the piston head itself shall be turned to the usual infinitesimal fraction of an inch smaller than the bore of the cylinder. As a matter of fact such a piston construction may be used in either new or old cylinders and one of the very advantageous features of my peculiar packing is that any unevenness in the cylinder walls is taken care of by the independent action of the separate coils of the packing as the uneven portions are reached in the movement of the piston within the cylinder. Many other advantages might be mentioned and will be obvious to those skilled in the art to which this invention refers and I do not wish to be limited to the exact configuration of the packing member hereinbefore described and as illustrated in the drawings, as it will be apparent that changes might be made in the formation of the piston in order to enable the expansion of a packing coil in the manner described.

Having thus described the invention, what is claimed as new is:—

1. The combination with a liquid pressure cylinder, of a piston therein having an annular peripheral groove and a packing in said groove comprising a strip of flexible elastic material wound in helical form about the piston, the helix being of a greater inner diameter than the diameter of the piston at the base of the groove and the helix being shorter than the width of the groove, the coils of the helix being movable relative to each other for enabling longitudinal circumferential travel of the strip and consequent radial expansion and contraction of the helix and the material of the strip being susceptible of radial deflection owing to its elasticity and flexibility for freely responding to surface variations of the cylinder.

2. The combination with a cylinder, of a piston having an annular peripheral groove and a packing in said groove comprising a strip of flexible material wound in helical form about the piston, the helix being of a greater inner diameter than the diameter of the piston at the base of the groove and the helix being shorter than the width of the groove, the coils of the helix being movable relative to each other for enabling longitudinal circumferential travel of the strip and consequent radial expansion and contraction of the helix for freely responding to surface variations of the cylinder.

3. The combination with a liquid pressure cylinder, of a piston therein having an annular peripheral groove, and a packing in said groove comprising a strip of flexible plastic material wound in helical form about the piston, the helix being of greater diameter than the diameter of the piston at the base of the groove and less in width than the width of the groove for enabling the pressure fluid to have access between the base of the groove and the inner surface of the helix for exerting radial outward pressure thereon, the coils of the helix being thus movable relative to each other for enabling variations in the circumference of the helix proportional to variations in the cylinder, each portion of the packing strip contacting with the inner face of the cylinder being susceptible of conforming to the part of the cylinder contacted with, independently of adjacent portions of the strip.

In testimony whereof I affix my signature in presence of two witnesses.

LAURITS A. LAURSEN.

Witnesses:
W. J. EBERWEIN,
ETHEL WILLETT.